United States Patent
Manicka

(10) Patent No.: US 11,488,209 B2
(45) Date of Patent: Nov. 1, 2022

(54) APPARATUS, PROCESS, AND SYSTEM FOR DISPLAY OF IMAGES ON WINDOWS OF VEHICLES

(71) Applicant: Manicka Institute LLC, Woodbury, MN (US)

(72) Inventor: Yatheendhar D. Manicka, Woodbury, MN (US)

(73) Assignee: Manicka Institute LLC, Woodbury, MN (US)

( * ) Notice: Subject to any disclaimer, the term of this patent is extended or adjusted under 35 U.S.C. 154(b) by 141 days.

(21) Appl. No.: 16/904,141

(22) Filed: Jun. 17, 2020

(65) Prior Publication Data

US 2020/0404465 A1    Dec. 24, 2020

Related U.S. Application Data

(60) Provisional application No. 62/862,957, filed on Jun. 18, 2019.

(51) Int. Cl.
| | |
|---|---|
| *H04W 4/23* | (2018.01) |
| *G06Q 30/02* | (2012.01) |
| *H04W 4/024* | (2018.01) |
| *G06Q 20/14* | (2012.01) |
| *H04W 4/48* | (2018.01) |
| *G09G 5/00* | (2006.01) |
| *G02B 27/01* | (2006.01) |
| *G09F 21/04* | (2006.01) |

(52) U.S. Cl.
CPC ......... *G06Q 30/0265* (2013.01); *G02B 27/01* (2013.01); *G06Q 20/14* (2013.01); *G06Q 30/0266* (2013.01); *G09F 21/04* (2013.01); *G09G 5/00* (2013.01); *H04W 4/024* (2018.02); *H04W 4/23* (2018.02); *H04W 4/48* (2018.02); *G09G 2370/02* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 3,722,119 | A | 3/1973 | Braun |
| 5,443,869 | A | 8/1995 | Harris |
| 5,992,888 | A | 11/1999 | North et al. |
| 7,791,785 | B2 | 9/2010 | Knafou et al. |
| 8,358,224 | B2 | 1/2013 | Seder et al. |
| 10,416,947 | B2 | 9/2019 | Zenoff |
| 10,740,796 | B2 | 8/2020 | Brubaker |

(Continued)

OTHER PUBLICATIONS

International Preliminary Report on Patentability for PCT Application Serial No. PCT/US2020/038152, dated Dec. 30, 2021, 9 pages.

(Continued)

*Primary Examiner* — Frantz Bataille
(74) *Attorney, Agent, or Firm* — Kinney & Lange, P.A.

(57) ABSTRACT

The present application discloses a windshield for a vehicle with the windshield having a first glass layer, a second glass layer, a first plastic interlayer between the first glass layer and the second glass layer, and an electronic display between the first glass layer and the plastic layer. The electronic display is configured to display at least one image when in operation.

16 Claims, 4 Drawing Sheets

(56) References Cited

U.S. PATENT DOCUMENTS

| | | |
|---|---|---|
| 2002/0084891 A1 | 7/2002 | Mankins et al. |
| 2004/0006929 A1 | 1/2004 | Hioki et al. |
| 2005/0157513 A1 | 7/2005 | Alexander et al. |
| 2007/0019424 A1 | 1/2007 | Alexander |
| 2010/0042505 A1 | 2/2010 | Straus |
| 2010/0090597 A1 | 4/2010 | Werners et al. |
| 2011/0128377 A1 | 6/2011 | Katz et al. |
| 2013/0046594 A1 | 2/2013 | Davidson |
| 2013/0074383 A1 | 3/2013 | Hagemann et al. |
| 2013/0246181 A1 | 9/2013 | Lobsenz |
| 2013/0258213 A1* | 10/2013 | Ek .................. G02F 1/133504 349/5 |
| 2013/0337887 A1 | 12/2013 | Meistrich et al. |
| 2014/0040016 A1 | 2/2014 | Amla et al. |
| 2014/0043156 A1 | 2/2014 | Howk |
| 2014/0279606 A1 | 9/2014 | Storm |
| 2014/0300830 A1 | 10/2014 | Wang |
| 2014/0344062 A1 | 11/2014 | Lamont |
| 2016/0026423 A1 | 1/2016 | Zenoff |
| 2017/0053317 A1 | 2/2017 | Dione |
| 2017/0200197 A1 | 7/2017 | Brubaker |
| 2018/0047057 A1 | 2/2018 | Mayfield et al. |
| 2018/0284328 A1 | 10/2018 | Kawai et al. |
| 2018/0348516 A1* | 12/2018 | Sadakane ........... G02B 27/0018 |
| 2019/0080356 A1 | 3/2019 | Han et al. |
| 2019/0166585 A1* | 5/2019 | Proano ................. H01Q 21/28 |
| 2019/0251600 A1 | 8/2019 | Cabrera et al. |
| 2020/0258478 A1 | 8/2020 | Mourou et al. |
| 2020/0404465 A1 | 12/2020 | Manicka |
| 2021/0362598 A1 | 11/2021 | Oh |

OTHER PUBLICATIONS

International Search Report and Written Opinion from PCT Application Serial No. PCT/US2020/038152, dated Sep. 3, 2020, 10 pages.

* cited by examiner

APPARATUS, PROCESS, AND SYSTEM FOR DISPLAY OF IMAGES ON WINDOWS OF VEHICLES

CROSS-REFERENCE TO RELATED APPLICATION

This application claims the benefit of U.S. Provisional Application No. 62/862,957, filed on Jun. 18, 2019, entitled "APPARATUS, PROCESS, AND SYSTEM FOR DISPLAY OF IMAGES ON WINDOWS OF VEHICLES" by Y. D. Manicka, which is incorporated by reference into this application in its entirety.

FIELD OF THE INVENTION

The present invention relates to the display of images on vehicles and, in particular, to apparatuses, systems, methods, mobile exchange applications, and online marketplaces to facilitate the display of digital/electronic images, such as advertisements, on/in windows and the body of vehicles. The apparatuses include a windshield having an integrated electronic display. The systems include an electronic display associated with a vehicle and a controller configured to receive information regarding the images to be displayed and instruct the electronic display to show the images. The methods include methods of transmitting and displaying the images on the vehicles. The mobile exchange applications and online marketplaces facilitate the exchange of information between a vehicle operator willing to display the images/advertisements and a user/business owner desiring to advertise on the vehicle by displaying the images/advertisements.

BACKGROUND

Many vehicles are equipped to display images on the body of the vehicle or in a small area of the windows of the vehicle. For example, commercial vehicles often display a company logo and other advertisements painted onto the body of the vehicle. Personal passenger vehicles often display logos or messages personal to the vehicle operator on a bumper or in a corner of the window of the car, such as a bumper sticker supporting the vehicle operator's favorite sports team. These images on commercial and passenger vehicles are fixed images that cannot be easily removed and replaced with another image due to the images being painted on the vehicle or affixed to the vehicle via a sticker or another adhesive. Additionally, the images are not sized and placed to take up large areas on the windows of the vehicle because such configurations would interfere with the sightlines of the vehicle operator, thus limiting the safe operation of the vehicle.

SUMMARY

A system for displaying images on a vehicle includes an electronic display associated with and configured to move in unison with the vehicle. The electronic display is configured to display an image when the system is in operation. The system also includes a controller in communication with the electronic display with the controller configured to receive user information regarding the image and instruct the electronic display to display the image.

A method of displaying images on a vehicle includes disclosing user information to an exchange application with the user information including an image to be displayed, transmitting the image to a controller configured to receive user information, instructing an electronic display associated with and configured to move in unison with the vehicle to display the image, and displaying the image by the electronic display.

The present application further discloses a windshield for a vehicle with the windshield having a first glass layer, a second glass layer, a first plastic interlayer between the first glass layer and the second glass layer, and an electronic display between the first glass layer and the plastic layer. The electronic display is configured to display at least one image when in operation.

DETAILED DESCRIPTION

Figure 1:
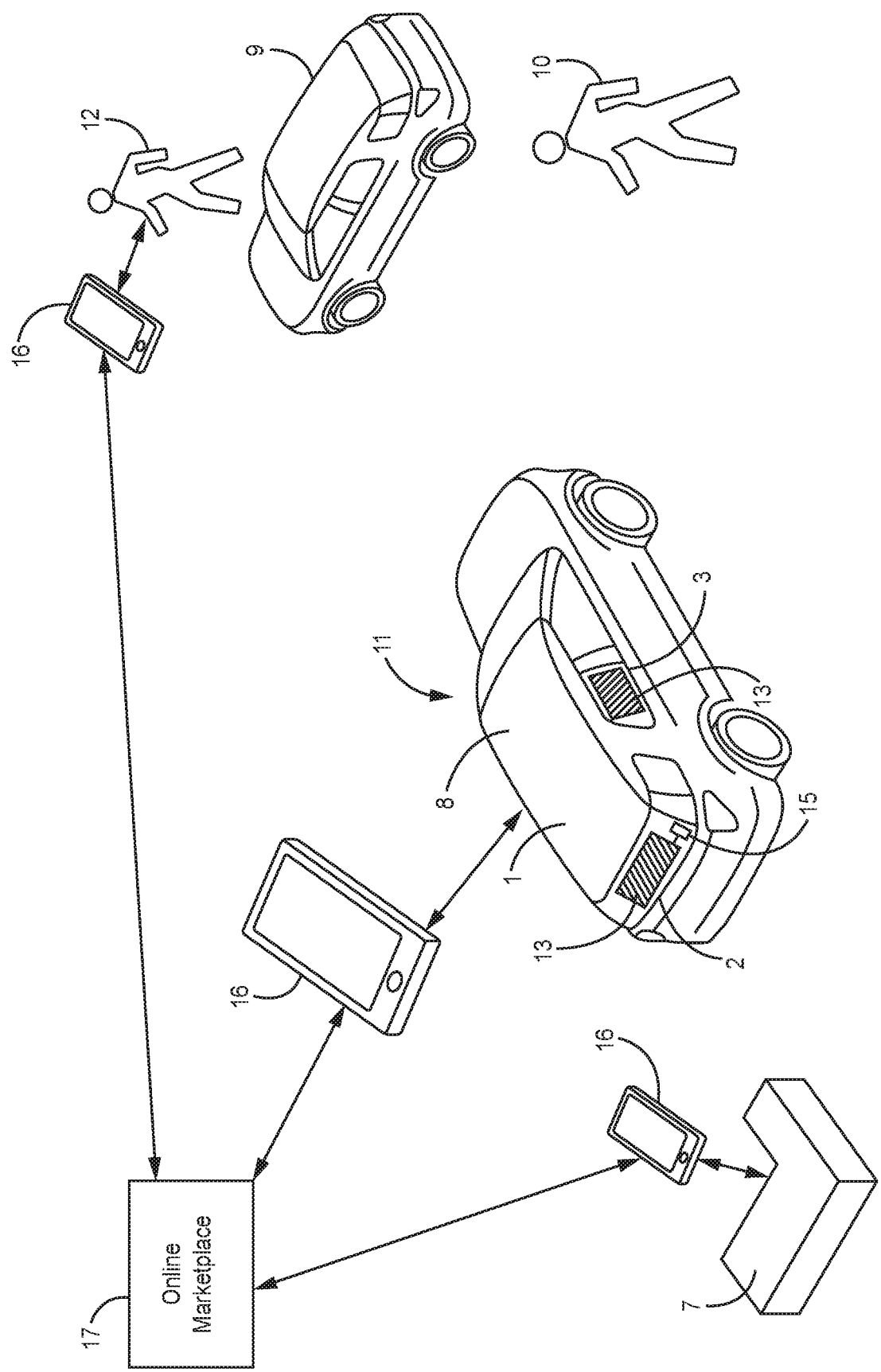
FIG. 1 is a schematic showing the relationship between the electronic display on the vehicle, the image/advertisement purchaser/user, and the hardware and software utilized to communicate and effectuate the display of images on the vehicle.

Systems, methods, and related apparatuses are disclosed herein for displaying digital/electronic images, such as advertisements, on a vehicle. The system for displaying the image includes an electronic display associated with/connected to the vehicle and a controller in communication with the electronic display with the controller configured to receive user information (e.g., information from the user/advertisement purchaser about the image, such as the image itself, a duration the image is to be displayed, the time of day the image is to be displayed, a geographical area within which the image is to be displayed, etc.) and instruct the electronic display to display the image.

The controller interacts with an exchange application, such as a website or mobile application, that can include an online marketplace. The exchange application and online marketplace facilitate a transaction between the vehicle operator and the user (i.e., advertisement purchaser) by providing an avenue through which both the user and vehicle operator can provide information which can be viewed by the other party to aid in deciding whether, in the case of the vehicle operator, to agree to display the image and, in the case of the user/advertisement purchaser, to pay to have the image displayed by the electronic display of the vehicle. For the user/advertisement purchaser, the user information disclosed to the exchange application can include the image itself, a duration the image is to be displayed, time of day the image is to be displayed, a geographical area within which the image is to be displayed, a price the user is willing to pay to display the image, payment information to be utilized if the image is displayed by the electronic display, and other relevant information. For the vehicle operator, the vehicle operator information disclosed to the exchange application can include a size of the electronic display, an availability of the electronic display to display the image, any costs the user would have to pay for displaying the image, any restrictions in content of the image, a location of the vehicle, a geographical areas within which the vehicle will be located, and other relevant information.

The controller and exchange application can include other features, such as location tracking capabilities (such as a global positioning system) and a mapping feature that can map one or multiple routes of the vehicle to a specified destination and show the price the user/advertisement purchaser (or the prices multiple advertisement purchasers) are willing to pay to display the image along each route. The controller and exchange application can have the capabilities to confirm that the image was displayed according to the user/advertisement purchaser's specifications/requirements and automatically bill the user/advertisement purchaser. The controller and electronic display can allow for the image to be easily switched out with another image dependent upon geographical location, time of day, duration of the display, and other factors. The controller can be, for example, integrated into the software system of the vehicle, a mobile telephone with connectivity capabilities with the electronic display, or a standalone system that is integrated into the electronic display.

The electronic display for displaying the image can be on or integrated into the body or one or multiple windows of the vehicle. For example, the electronic display can be a light-emitting diode (LED) screen, a liquid crystal display (LCD) screen, or another type of screen that is fastened to the body of the vehicle or positioned in a window of the vehicle. Further, the electronic display can be built into the body or integrated into a window of the vehicle. The electronic display can be transparent when viewed in one direction (such as when an occupant of the vehicle, such as a driver, looks out of the vehicle through the electronic display) but displays the image when viewed in the other direction (such as when an individual is looking at/into the window and/or body).

The system can include many other features, including one or multiple speakers in communication with the controller and configured to play audio to accompany the image and/or sensors to detect the presence of humans outside the vehicle (via motion detection and/or voice detection) and relay that information to the controller so the controller can instruct the electronic display to display the image when people are present near the vehicle.

A windshield is disclosed herein that includes an electronic display integrated into the windshield between two glass layers and accompanied by a plastic interlayer. The electronic display integrated into the windshield can be configured to operate both when the vehicle is in operation and the vehicle is parked or only when the vehicle is parked. Additionally, the windshield can include a processor/controller in communication with the electronic display to receive the image to be displayed and instruct the electronic display to display the image. The processor/controller can have the other capabilities described with regards to the controller in the previous paragraph. The windshield can include other features, such as a memory module to store the image, an antenna with wireless communication capabilities to communicate with the exchange application and/or online marketplace, and circuitry that electrically connects the electronic display and other electronic components of the windshield to the electrical power systems of the vehicle or another power source. The glass layers and plastic interlayer of the windshield can be commercial grade to ensure the windshield meets automotive safety standards. Further, while the windshield disclosed herein is discussed with regards to a front windshield of a vehicle, the configuration can also be utilized on side, back, and top (i.e., sun/moon roof) windows of the vehicle.

The system for displaying images on a vehicle is advantageous because the system easily allows a vehicle operator to display multiple images over a relatively short duration of time to allow a vehicle operator to monetize his/her vehicle. It also allows a user/advertisement purchaser to rent advertisement space that is tailored specifically to his/her needs regarding, for example, duration, time of day, and geographical location without costly overhead that would otherwise be required if the image was not digital/electronic and was instead painted or otherwise affixed to the vehicle. Rather, the disclosed system allows for the image to be easily changed without the need to modify the vehicle. The system, through the exchange application and/or online marketplace, facilitates the exchange between the vehicle operator and user/advertisement purchaser so that each can easily see the other's specifications/requirements for displaying the image (e.g., costs, duration of display, size of electronic display, and content of image to be displayed).

While this disclosure discusses the image as being an advertisement, the image can be anything desired by the vehicle operator or the user (i.e., the renter of the electronic display), such as a company logo, a personal message of the vehicle operator, a personal image of the vehicle operator, a slogan, and/or a video. Furthermore, the image can be multiple images displayed simultaneously on one electronic display or multiple electronic displays associated with one vehicle.

Figure 2:
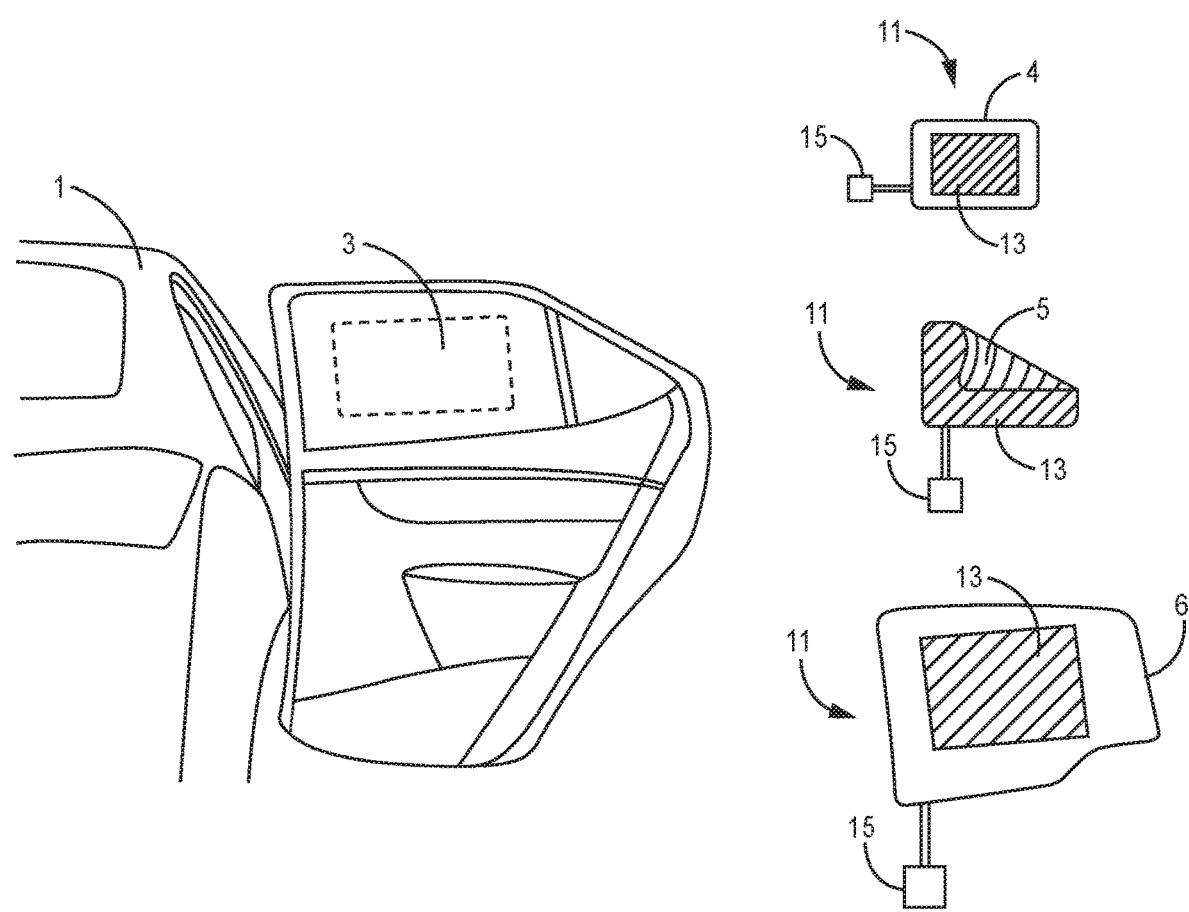
FIG. 2 shows exemplary systems for the display of images, such as advertisements, on a side window of the vehicle.
Figure 3:
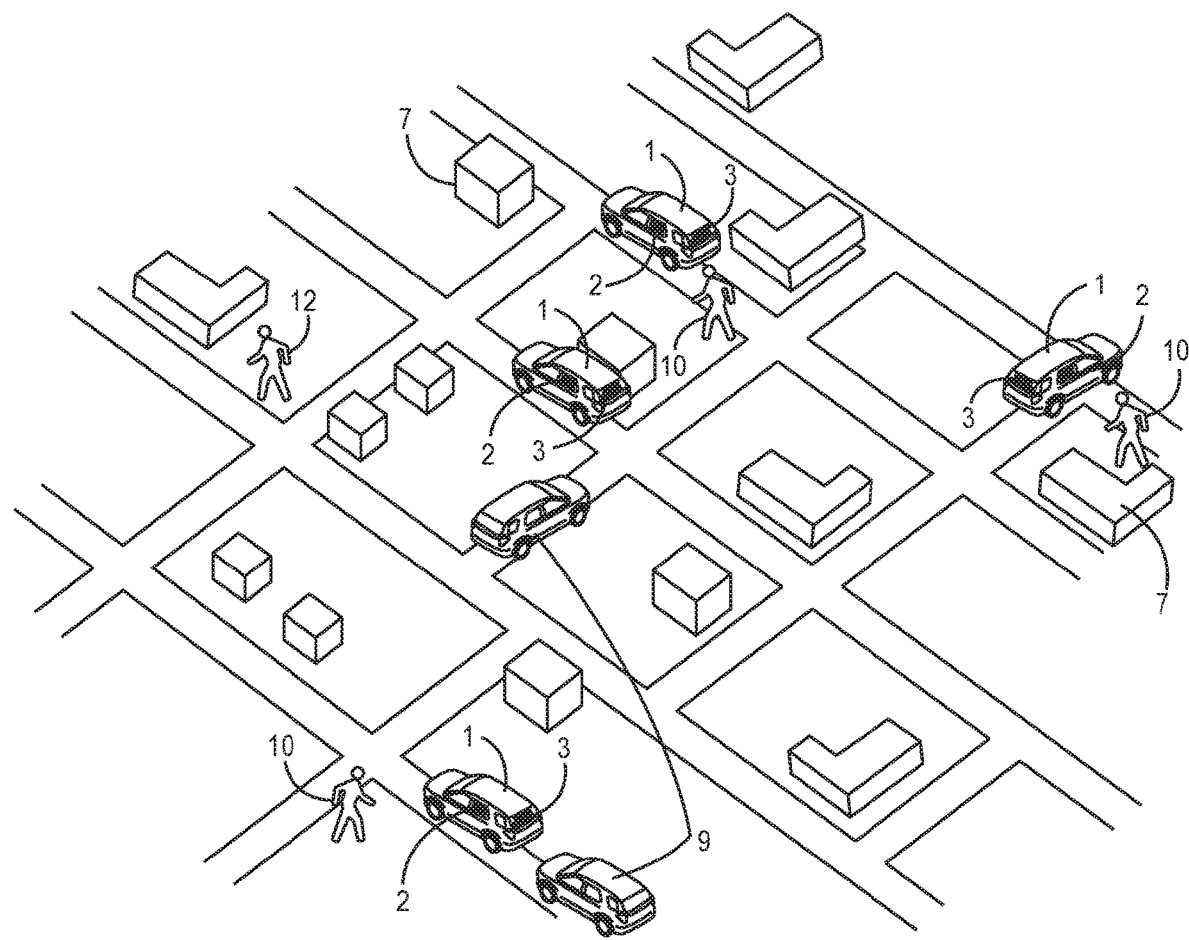
FIG. 3 shows an exemplary environment for the display of images on the vehicle.

FIG. 1 is a schematic showing the relationship between the system for displaying the image, the vehicle that includes the electronic display, the vehicle operator, the user/advertisement purchaser, and the exchange application and online marketplace. FIG. 2 shows a side electronic display with three different embodiments. FIG. 3 shows an exemplary environment within which the system for displaying the image in a vehicle may be utilized.

FIGS. 1-3 shows display vehicle 1 having rear electronic display 2 and side electronic display 3. System 11 with rear electronic display 2 and/or side electronic display 3 can have three different configurations: tablet 4, flexible screen 5, and integrated display 6. The environment in which the system for displaying the image includes business image user/purchaser 7, vehicle operator 8, vehicle audience 9, pedestrian audience 10, and individual image user/purchaser 12. System 11 further includes image/advertisement 13, controller 15, exchange application 16, and online marketplace 17.

Vehicle 1, which includes electronic displays 2 and/or 3 and controller 15, can be any commercial or passenger vehicle. Vehicle 1 is owned, operated, and/or otherwise associated with vehicle operator 8. Vehicle operator 8 can be the owner of vehicle 1, a driver for the owner of vehicle 1 (such as a taxi service), and/or anyone associated with or able to make decisions regarding the display of image 13 on electronic displays 2/3. Vehicle 1 can include multiple displays (rear electronic display 2 and/or side electronic display 3) to display image 13 to be viewable by vehicle audience 9 and pedestrian audience 10. Further, each window can include multiple electronic displays 2 and 3 that take up only a portion of the window. In addition, while not shown in FIGS. 1-3, the front windshield can also be configured to include an electronic display. Electronic displays 2 and/or 3 can be configured to always display image 13, only display image 13 when vehicle 1 is in motion, or only display image 13 when vehicle 1 is stationary.

Rear electronic display 2 and side electronic display 3 can have many different configurations/capabilities to electronically/digitally display images 13, which can be advertisements. While this disclosure discusses the electronic displays as being positioned in rear and side windows, the electronic displays can be located anywhere on vehicle 1, including on/in any windows (e.g., the front windshield) or on/in any portion of the body of vehicle 1 (e.g., doors, hood, roof, and front and rear panels). FIG. 2 includes multiple exemplary embodiments of side electronic display 3.

Tablet 4 can be a generic electronic device with a digital screen that can include wired or wireless communication capabilities to transmit and receive information for the display of image 13, or tablet 4 can be a specialized display screen that includes additional features (discussed below) for receiving and displaying image 13 and, optionally, audio to accompany image 13. Tablet 4 can be fastened to or merely propped up in a window or on the body of vehicle 1 such that the screen of tablet 4 is viewable through the window by advertisement audience 9 and 10. The screen of tablet 4 can be any screen configured to display an electronic/digital image, such as a light-emitting diode ("LED") display, a liquid crystal display ("LCD:"), or another type of screen. Further, tablet 4 can have a screen that is transparent from the inside such that the operator of vehicle 1 can look out through the window but audience 9/10 can view electronic display 2/3 when looking into the window when electronic display 2/3 is displaying image 13.

Flexible screen 5 can be a generic electronic/digital screen or a specialized display screen. Flexible screen 5 can be a light-emitting diode ("LED") display, a liquid crystal display ("LCD:"), a projection screen that displays the images projected onto flexible screen 5 by a projector within vehicle 1, or another type of screen. Flexible screen 5 can be fastened to or propped up in a window or on the body of vehicle 1 such that the screen is viewable through the window by advertisement audience 9/10. Flexible screen 5 can include wired or wireless communication capabilities, and flexible screen 5 can be transparent from the inside such that a driver can look through flexible screen 5 to operate image/display vehicle 1. Flexible screen 5 can have all of the features and capabilities of tablet 4 discussed above and can include additional features and capabilities.

Integrated display 6 can be an electronic/digital screen that is integrated into the vehicle window, such as the windshield described with regards to FIG. 4 below. Integrated display 6 can be any type of electronic/digital screen able to be integrated into a window (such as sandwiched between two panes/layers of a window). Integrated display 6 can be transparent from the inside such that vehicle operator 8 can look through integrated display 6 and/or someone outside vehicle 1 can look through integrated display 6 when the screen is not displaying image 13. When in use, integrated display 6 can provide a digital display that is viewable by vehicle audience 9 and/or pedestrian audience 10. Integrated display 6 can have wired or wireless communication capabilities. Integrated display 6 can have all of the features and capabilities of tablet 4 and flexible screen 5 discussed above and can include additional features and capabilities.

System 11 for displaying image 13, which includes one or more electronic displays 2 and 3, also includes controller 15. Controller 15 can be or include a computing device, computer processor, micro-processor, or other module in communication with electronic display 2/3. Controller 15 is configured to receive user information of business image user/purchaser 7 and/or individual image user/purchaser 12 (also collectively referred to as user 7/12 in this disclosure) regarding image 13 and instruct electronic display 2/3 to display image 13. Controller 15 can also transmit vehicle 1 and/or electronic display 2/3 information via a wireless or wired connection to exchange application 16, which can include online marketplace 17. Controller 15 can be in communication with multiple electronic displays 2/3 such that controller 15 receives user information regarding images 13 to be displayed on multiple electronic displays 2/3 and instruct the multiple electronic displays 2/3 to display the images. Controller 15 can be a stand-a-lone component with transmission and reception capabilities (among other features), can be integrated into one or multiple electronic displays 2/3 such that controller 15 and electronic display 2/3 are one continuous and monolithic component (e.g., housed within the same casing), can be integrated into a software system of vehicle 1 such that vehicle 1 includes controller 15 or the functionality of controller 15 is performed by the components of the software system of vehicle 1, and/or can be a mobile telephone with connectivity capabilities (wired or wireless) with electronic display 2/3 that is suitable to receive and transmit information regarding image 13.

Controller 15 can be configured to instruct electronic display 2/3 to not display image 13 (i.e., remain blank), a particular image 13 (e.g., only a small image in a corner of electronic display 2/3), emit a particular sound associated with or disassociated with image 13, and/or refrain from emitting any sound when the vehicle is in motion so as to not block the view of the operator/driver of vehicle 1 or distract nearby vehicles. Controller 15 can be configured to instruct electronic display 2/3 to display image 13 and/or emit a particular sound associated with image 13 when vehicle 1 is stationary (e.g., when vehicle 1 is parked with the engine off, when vehicle 1 is at a stop light, etc.).

System 11, whether a stand-alone component or incorporated into controller 15 and/or electronic display 2/3, can include a variety of additional features and capabilities. Electronic display 2/3 and/or controller 15 can include location tracking capabilities, such as global positioning system (GPS) tracking for recording the locations of electronic display 2/3 during the display of image 13.

System 11 can include a speaker or another audio system in communication with (or integrated into) controller 15 that is configured to generate audio (i.e., play audio) to accompany image 13. The audio played by the speaker could be, for example, the audio to an advertisement/commercial video being displayed on electronic display 2/3. The audio generated by the speaker could also be from a radio in vehicle 1 or a transmission of the voice of vehicle operator 8.

System 11 can include a motion sensor in communication with or integrated into controller 15 and/or electronic display 2/3 that is configured to detect motion outside vehicle 1 (e.g., a human walking by vehicle 1 and electronic display 2/3) and transmit the information (i.e., that motion is outside vehicle 1) to controller 15, which in turn can then instruct electronic display 2/3 to display image 13. Thus, system 11 can be configured to only display image 13 when motion/human activity is detected outside vehicle 1.

System 11 can include a sound detection sensor in communication with or integrated into controller 15 and/or electronic display 2/3 that is configured to detect a sound of human voice outside vehicle 2 (e.g., a human walking by vehicle 1 and electronic display 2/3) and transmit the information (i.e., that a person is outside vehicle 1) to controller 15, which in turn can then instruct electronic display 2/3 to display image 13. Thus, system 11 can be configured to only display image 13 when the sound of a human is detected outside vehicle 1. The sound detection sensor can be any component able to detect sound, such as a human voice, outside vehicle 1. For example, the sound detection sensor can be a microphone.

System 11 can include a battery to provide electrical power to electronic display 2/3 and possibly to controller 15. The battery can be incorporated into electronic display 2/3 and/or controller 15, or electronic display 2/3 and/or controller 15 can be electrically connected to the power system of vehicle 1, such as through a charging port of vehicle 1.

System 11 can include a memory module (i.e., a data storage device/storage medium) in communication with or integrated into controller 15 and/or electronic display 2/3 that is configured to store a digital/data file that includes image 13. The memory module can be any type of data storage device or storage medium, and the memory module can be configured to store other data, such as audio files, vehicle location data, user information of the image/advertisement purchaser 7/12, and vehicle operator information from vehicle operator 8.

System 11 can include an antenna in communication with or integrated into controller 15 and/or electronic display 2/3 that is configured to receive information containing image 13 and transmit image 13 to controller 15 and/or electronic display 2/3. The antenna can have wired or wireless capabilities, such as Wi-Fi networking and/or short-wavelength ultra-high frequency (UHF) radio waves (e.g., Bluetooth). The antenna can communicate with a mobile telephone of vehicle operator 8, or the antenna can be integrated into the mobile telephone of vehicle operator 8 with the mobile telephone being integrated into or in communication with controller 15.

Controller 15 is in communication with exchange application 16, which can include online marketplace 17. Exchange application 16 can be a website or mobile application to store and/or display information from image/advertisement user/purchaser 7/12 and vehicle operator 8 relevant to the display of image 13. Exchange application 16 provides an avenue through which both user 7/12 and vehicle operator 8 can provide information that can be viewed by the other party to aid in deciding whether, in the case of the vehicle operator 8, to agree to display image 13 and, in the case of the user/advertisement purchaser 7/12, to pay to have image 13 displayed by electronic display 2/3 of vehicle 1. For user/advertisement purchaser 7/12, the user information disclosed to exchange application 16 can include the image 13 itself, a duration image 13 is to be displayed, time of day image 13 is to be displayed, a geographical area within which image 13 is to be displayed, a price user 7/12 is willing to pay to display image 13, payment information to be utilized if image 13 is displayed by electronic display 2/3, and other relevant information. For vehicle operator 8, the vehicle operator information disclosed to exchange application 16 can include a size of electronic display 2/3, an availability of electronic display 2/3 to display image 13, any costs user 7/12 would have to pay for displaying image 13, any restrictions in content of image 13, a location of vehicle 1, the make and model of vehicle 1, a geographical areas within which vehicle 1 is or will be located and other relevant information. Exchange application 16 facilitates a transaction between vehicle operator 8 and image/advertisement user/purchaser 7/12 to display image 13 by electronic display 2/3. Exchange application 16 can include any of the features of controller 15, and exchange application 16 can be a computing device, computer program, and/or application that is implemented on and integrated into controller 15 (e.g., controller 15 is a mobile telephone and exchange application 16 is a computer program/application on the mobile telephone).

Exchange application 16 can include location tracking capabilities (such as GPS) and mapping features that can map one or multiple routes that vehicle 1 could take to a potential destination and show information regarding the routes and the display of image 13, such as the price user 7/12 is willing to pay to display image 13 along each route. Exchange application 16, in association with electronic display 2/3 and potentially controller 15, can monitor the display of image 13 (e.g., the duration image 13 is displayed, the time of day image 13 is displayed, the locations where image 13 is displayed, etc.) to confirm that image 13 was displayed according to the specifications of user 7/12. Alternatively, controller 15 can transmit this information to exchange application 16, which then relays the information to user 7/12. Further, exchange application 16 can automatically provide this information to user 7/12 and/or disclose this information to online marketplace 17 for viewing by potential users 7/12. Additionally, exchange application 16 can have the capabilities to automatically bill user 7/12 for the services rendered in vehicle operator 8 displaying image 13.

Electronic display 2/3 and/or controller 15 can be in constant/continuous communication with exchange application 16 when system 11 is in operation, or electronic display 2/3 and/or controller 15 can communicate with exchange application 16 only periodically to transmit and/or receive information. When communication is periodic, system 11 can have storage capabilities such that image 13 or multiple images 13 can be downloaded to system 11 along with a display schedule for a duration of time (e.g., advertisement A is displayed for 24 hours, advertisement B is displayed for the 48 hours after that, etc.) and/or other information. This information can be downloaded and/or provided to image/display vehicle 1 and/or electronic display 2/3 wirelessly, via a USB drive, or by other connections. Such capabilities allow for electronic display 2/3 to continue uninterrupted to display of image 13 even when vehicle 1 is unable to wirelessly connect to exchange application 16 and/or online marketplace 17.

Exchange application 16 can include online marketplace 17, which is a platform that vehicle operator 8 and image/advertisement user/purchaser 7/12 can disclose and display information that may be useful to the other in determining whether to agree to the display of image 13 on electronic display 2/3. Along with exchange application 16, online marketplace 17 facilitates the exchange between vehicle operator 8 and user 7/12. Online marketplace 17 can display for viewing a large amount of information, including any of the information disclosed to exchange application 16 listed in the previous paragraphs. Through online marketplace 17, vehicle operator 8 can view the information provided by image user/purchaser 7/12 and determine whether vehicle operator 8 wants to agree to display image 13 for user/purchaser 7/12, and user/purchaser 7/12 can view the information provided by vehicle operator 8 and determine whether user 7/12 wants to agree to display image 13 on electronic display 2/3. Online marketplace 17 can be configured to display information for multiple users 7/12 to allow vehicle operator 8 to decide from multiple offers to display different images 13, and information for multiple vehicle operators 8 to allow user 7/12 to decide from multiple offers to display image 13. Thus, online marketplace 17 aids in the offer and acceptance of the display of image 13 and the exchange of services (i.e., the display of image 13) for goods (i.e., money).

As shown in FIG. 1, exchange application 16 can be a mobile phone application that is downloaded to a smart phone of user 7/12 and vehicle operator 8 to allow the input and viewing of information as well as to allow access to online marketplace 17.

As shown in FIG. 3, vehicle 1 displaying image 13 can move throughout and/or be stationary within the environment, thereby displaying image 13 to audience 9/10. The environment within which image 13 is displayed can be a geographical area near a place of business or residence of user 7/12 and can be at any time of day, including during business hours and/or on nights and weekends. The location/geographical area within which image 13 is displayed by electronic display 2/3 can be as specific as image 13 only being displayed near particular buildings, when vehicle 1 travels down particular streets, when vehicle 1 is traveling at a particular speed, or other parameters.

Image 13 displayed by electronic display 2/3 can be a video and/or multiple images 13 that are displayed simultaneously, in series with multiple images 13 alternating in being displayed, or another configuration.

Figure 4:
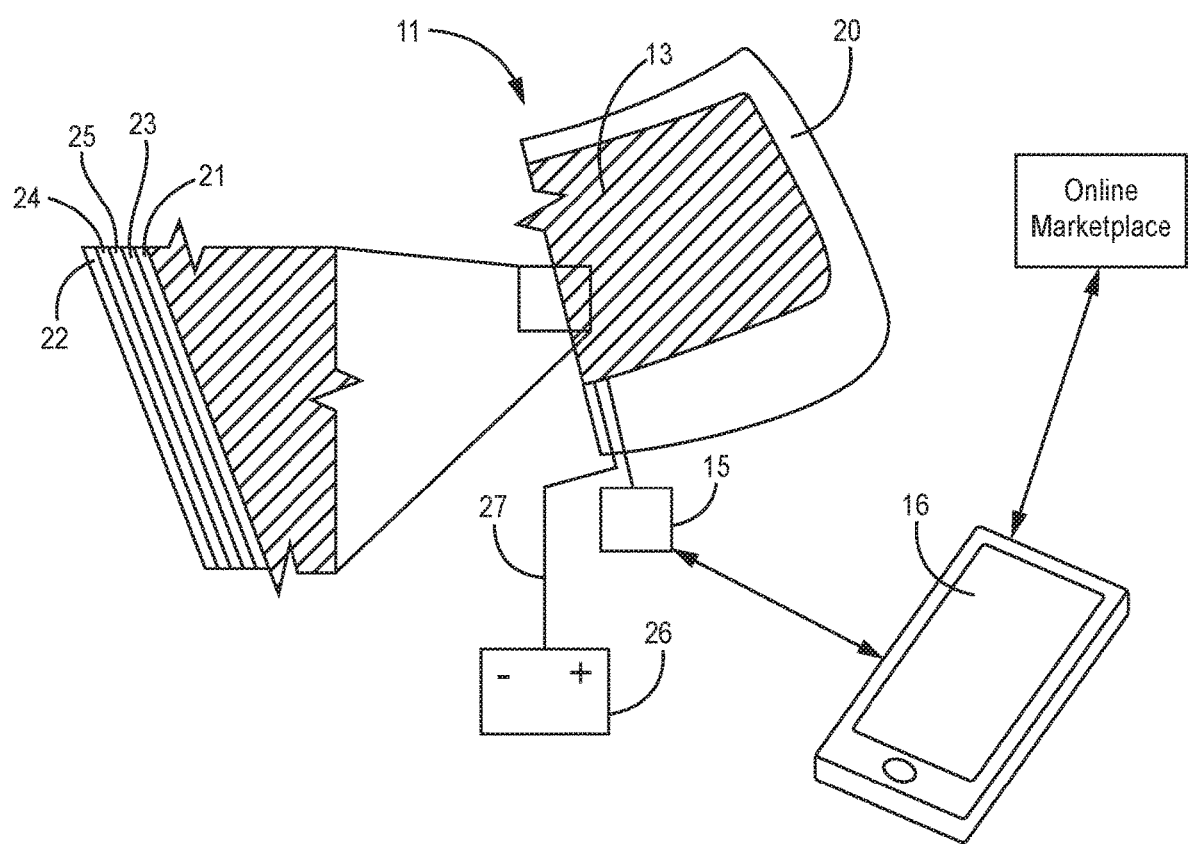
FIG. 4 shows a window of a vehicle that includes an integrated electronic display.

FIG. 4 shows a window of a vehicle that includes an integrated electronic display. In FIG. 4, the window is front windshield 20. However, the configuration shown in FIG. 4 can be utilized in any window of vehicle 1. Windshield 20 includes first glass layer 21 and second glass layer 22. Between first glass layer 21 and second glass layer 22 is first plastic interlayer 23, electronic display 25, and second plastic interlayer 24. Windshield 20 can also include controller 15 (shown in FIGS. 1-3), battery 26, and circuitry 27.

Windshield 20 can be sized and shaped to fit into and cover any opening in vehicle 1. Windshield 20 can be configured to meet all automotive safety standards, such as first glass layer 21 and second glass layer 22 having commercial grade hardened glass, first plastic interlayer 23 and second plastic interlayer 25 being configured to prevent windshield 20 from shattering and breaking apart into multiple pieces.

First glass layer 21 and second glass layer 22 can be structural, transparent layers that can be glass or other material suitable to protect the occupants of vehicle 1 while also allowing for viewing through windshield 20. First glass layer 21 and second glass layer 22 can be any conventional glass utilized for windows of a vehicle. First glass layer 21 is on a first side of windshield 20, while second glass layer 22 is on a second side of windshield 20. In the disclosed windshield 20, first glass layer 21 and second glass layer 22 form the outer bounds of windshield 20, but other configurations can have additional layers or components outward from first glass layer 21 and/or second glass layer 22, such as electronic display 24.

First plastic interlayer 23 and second plastic interlayer 24 provide containment to first glass layer 21 and second glass layer 22 in the event of the breaking of either glass layer. While this disclosure states that the interlayers are plastic, first plastic interlayer 23 and second plastic interlayer 24 can be constructed from any material(s) suitable to provide containment and/or structural support to windshield 20. Additionally, windshield 20 can have more than two plastic interlayers, or other embodiments of windshield 20 can include none or only one plastic interlayer.

Electronic display 25 is between first plastic interlayer 23 and second plastic interlayer 24. Electronic display 25 is configured to display image 13 (any potentially more than one image 13) in a direction towards an outer side of windshield 20 (i.e., towards an outside of vehicle 1). Electronic display 25 can have the features and capabilities of rear electronic display 2 and/or side electronic display 3 (and tablet 4, flexible screen 5, and integrated display 6) described with regards to system 11 and FIGS. 1-3. In front windshield 20, electronic display 25 is a transparent screen that allows for viewing through windshield 20 from inside vehicle 1 unobstructed. Electronic display 25 can be any type of display apparatus, including an LED screen, an LCD screen, a projection screen, or another type of display screen. Electronic display 25 can be sized such that the area of electronic display 25 is small, including an area that is less than 10% of the area of windshield 20, or large, including an area that is greater than 50% of the area of windshield 20. In some embodiments, the area of electronic display 25 can be almost equal to the area of windshield 20 (e.g., the area of electronic display 25 is more than 90% the area of windshield 20).

Windshield 20 can include (either integrated into the layers of windshield 20 or as a separate component) controller 15 as described with regards to system 11 and FIGS. 1-3. Controller 15 is in communication with electronic display 25 and is configured to receive image 13 and instruct electronic display 25 to display image 13. Controller 15 can have the features and capabilities described above with regards to system 11. Windshield 20 and/or controller 15 can include a memory module (i.e., a data storage device/storage medium) in communication with (or integrated into) controller 15 and/or electronic display 25 that is configured to store a digital/data file that includes image 13. The memory module can be any type of data storage device or storage medium, and the memory module can be configured to store other data, such as audio files, vehicle location data, user information of the image/advertisement purchaser 7/12, and vehicle operator information from vehicle operator 8. The memory module can be integrated into the layers of windshield 20 or a separate component. Additionally, windshield 20 and/or controller 15 can include an antenna in communication with (or integrated into) controller 15 and/or electronic display 25 that is configured to receive information containing image 13 and transmit image 13 to controller 15 and/or electronic display 25. The antenna can have wired or wireless capabilities, such as Wi-Fi networking and/or short-wavelength ultra-high frequency (UHF) radio waves (e.g., Bluetooth). The antenna can communicate with a mobile telephone of vehicle operator 8, or the antenna can be integrated into the mobile telephone of vehicle operator 8 with the mobile telephone being integrated into or in communication with controller 15. Further, the antenna can transmit information to exchange application 16.

Windshield 20 can include battery 26 in electrical communication with electronic display 24 via circuitry 27 to provide electrical power to electronic display 25. Battery 26 can be integrated into the layers of windshield 20, can be integrated into controller 15, or can be a separate component. For example, battery 26 can be the battery of vehicle 1 with circuitry 27 connecting battery 26 to electronic display 25. Battery 26 can be any type of device able to provide power to electronic display 25, controller 15, and/or the other electrically powered components of windshield 20.

System 11 and windshield 20 for displaying image 13 on vehicle 1 (and corresponding methods) are advantageous because system 11 and windshield 20 easily allow vehicle operator 8 to display multiple images 13 over a relatively short duration of time in order to monetize his/her vehicle 1. System 11 and windshield 20 also allow user/advertisement purchaser 7/12 to rent advertisement space that is tailored specifically to his/her needs regarding, for example, duration, time of day, and geographical location without costly overhead that would otherwise be required if the image was not electronic/digital and was instead painted or otherwise affixed to vehicle 1. Rather, system 11 and windshield 20 allow for image 13 to be easily changed without the need to modify vehicle 1. System 11 and windshield 20, through exchange application 16 and/or online marketplace 17, facilitate the exchange between vehicle operator 8 and user/advertisement purchaser 7/12 so that each can easily see the other's requirements/specifications for displaying image 13 (e.g., costs, duration of display, size of electronic display, content of image to be displayed).

Disclosure of Possible Embodiments

The following are non-exclusive descriptions of possible embodiments of the present invention.

A system for displaying images on a vehicle includes an electronic display associated with and configured to move in unison with the vehicle. The electronic display is configured to display an image when the system is in operation. The system also includes a controller in communication with the electronic display with the controller configured to receive user information regarding the image and instruct the electronic display to display the image.

The system of the preceding paragraph can optionally include, additionally and/or alternatively, any one or more of the following features, configurations, steps, and/or additional components:

The system further includes an exchange application configured to allow a user to transmit user information to the controller and allows a vehicle operator to view the user information.

Wherein the exchange application includes an online marketplace that is configured to allow the user to disclose the user information, which includes at least one of the following: the image itself, a duration the image is to be displayed, time of day the image is to be displayed, a geographical area within which the image is to be displayed, a price the user is willing to pay to display the image, and payment information to be utilized if the image is displayed by the electronic display.

Wherein the exchange application is configured to map a route of the vehicle.

Wherein the exchange application shows multiple routes that the vehicle may take with the exchange application associating each route with the price the user is willing to pay to display the image along the route.

Wherein the online marketplace of the exchange application allows a vehicle operator to view the user information and accept an offer made by the user to display the image.

Wherein the online marketplace allows multiple users to display multiple offers for displaying the image and allows the vehicle operator to accept at least one of the offers.

Wherein the exchange application is configured to allow the vehicle operator to disclose at least one of the following: a size of the electronic display, an availability of the electronic display to display the image, any costs the user would have to pay for displaying the image, any restrictions in content of the image, a location of the vehicle, and a geographical areas within which the vehicle will be located.

Wherein the controller transmits at least one of the following to the exchange application to be viewed by the user: a duration of the display of the image, time of day the image was displayed, a location of the vehicle during the display of the image, and confirmation that the image was displayed by the electronic display.

Wherein the exchange application automatically bills the user for services rendered by the vehicle operator in displaying the image.

Wherein the vehicle includes multiple electronic displays that each display at least one image and the controller is in communication with each of the multiple electronic displays with the controller configured to receive user information regarding the images and instruct the multiple electronic displays to display the images.

Wherein the controller is integrated into a software system in the vehicle.

Wherein the controller is a mobile telephone.

Wherein the controller is integrated into the electronic display.

Wherein the image is a series of images that form a video that is displayed by the electronic display.

Wherein the controller includes a global positioning system tracker for recording a location of the electronic display.

Wherein the image is one of the following: an advertisement, a company logo, a personal message of the vehicle operator, and a personal image of the vehicle operator.

Wherein the electronic display is positioned in at least one window of the vehicle.

Wherein the electronic display is integrated into a window of the vehicle.

Wherein the electronic display is connected to a body of the vehicle.

Wherein the electronic display is integrated into a front windshield of the vehicle.

Wherein the system further includes a speaker in communication with the controller and configured to generate audio to accompany the image.

Wherein the controller instructs the speaker to refrain from generating audio when the vehicle is in motion, and wherein the controller instructs the speaker to generate audio when the vehicle is stationary.

Wherein the system further includes a motion sensor in communication with the controller, the motion sensor configured to detect motion outside the vehicle and transmit that information to the controller.

Wherein the controller instructs the electronic display to display the image when the controller receives information from the motion sensor that there is motion outside the vehicle.

Wherein the system further includes a sound detection sensor in communication with the controller, the sound detection sensor configured to detect a sound of human voice outside the vehicle and transmit that information to the controller.

Wherein the controller instructs the electronic display to display the image when the controller receives information from the sound detection sensor that there is the sound of human voice outside the vehicle.

Wherein the controller instructs the electronic display to not display the image when the vehicle is in motion.

Wherein the controller instructions the electronic display to display the image when the vehicle is stationary A method of displaying images on a vehicle includes disclosing user information to an exchange application with the user information including an image to be displayed, transmitting the image to a controller configured to receive user information, instructing an electronic display associated with and configured to move in unison with the vehicle to display the image, and displaying the image by the electronic display.

The method of the preceding paragraph can optionally include, additionally and/or alternatively, any one or more of the following features, configurations, steps, and/or additional components:

Wherein the method further includes, after the image has been displayed, automatically billing a user who requested the image to be displayed for the services rendered by a vehicle operator in displaying the image.

Wherein the method further includes mapping a route of the vehicle during which the image is displayed by the electronic display; and transmitting the route of the vehicle to the exchange application that is able to be viewed by the user that requested the image to be displayed.

Wherein the exchange application shows multiple routes that the vehicle may take with the exchange application associating each route with a price the user is willing to pay to display the image along the route.

Wherein the method further includes disclosing the user information to the exchange application includes making an offer for displaying the image and accepting the offer to display the image.

Wherein the method further includes disclosing display information to an online marketplace of the exchange application that is able to be viewed by a user, the display information including at least one of the following: a size of the electronic display, an availability of the electronic display to display the image, any costs the user would have to pay for displaying the image, any restrictions in content of the image, a location of the vehicle, and a geographical area within which the vehicle will be located.

Wherein the method further includes transmitting display information from the controller to an online marketplace of the exchange application that is able to be viewed by a user who requested for the image to be displayed by the electronic display.

Wherein the display information includes at least one of the following: a duration of the display of the image by the electronic display, a location of the vehicle during the display of the image, and confirmation the image was displayed by the electronic display.

Wherein the method further includes tracking a location of the vehicle by a global positioning system during the display of the image by the electronic display.

Wherein the image is one of the following: an advertisement, a company logo, a personal message of a vehicle operator, and a personal image of the vehicle operator.

Wherein the method further includes positioning the electronic display in at least one window of the vehicle.

Wherein the method further includes integrating the electronic display into a window of the vehicle such that the electronic display is connected to the window.

Wherein the method further includes connecting the electronic display to a body of the vehicle.

Wherein the method further includes displaying multiple images in succession to form a video.

Wherein the user information further includes audio to accompany the image to be displayed.

Wherein the method further includes transmitting the audio to a controller configured to receive user information; instructing, by the controller, a speaker associated with and configured to move in unison with the vehicle to generate the audio; and generating audio, by the speaker, to accompany the display of the image.

Wherein the method further includes detecting motion outside the vehicle by a motion sensor; transmitting, to the controller, information that there is motion outside the vehicle; and instructing, by the controller, the electronic display to display the image when the controller receives information that there is motion outside the vehicle.

Wherein the method further includes detecting a sound of human voice outside the vehicle by an audio sensor; transmitting, to the controller, information that there is sound of human voice outside the vehicle; and instructing, by the controller, the electronic display to display the image when the controller receives information that there is the sound of human voice outside the vehicle.

A windshield for a vehicle with the windshield having a first glass layer, a second glass layer, a first plastic interlayer between the first glass layer and the second glass layer, and an electronic display between the first glass layer and the plastic layer. The electronic display is configured to display at least one image when in operation.

The windshield of the preceding paragraph can optionally include, additionally and/or alternatively, any one or more of the following features, configurations, steps, and/or additional components:

Wherein the electronic display is a light-emitting diode (LED) screen.

Wherein the electronic display is a liquid crystal display (LCD) screen.

Wherein the windshield further includes a second plastic interlayer between the electronic display and the second glass layer.

A vehicle that includes the above windshield with the windshield having a battery to provide electrical power to the vehicle and circuitry that electrically connects the electronic display to the battery.

Wherein the windshield further includes a controller in communication with the electronic display, the controller configured to receive the at least one image to be displayed on the electronic display and instruct the electronic display to display the at least one image.

Wherein the windshield further includes a memory module in communication with the controller, the memory module configured to store the at least one image to be displayed on the electronic display.

Wherein the windshield further includes an antenna in communication with the controller, the antenna having wireless communication capabilities and configured to receive a wireless communication of the at least one image and transmit the at least one image to the controller.

Wherein the wireless communication is Wi-Fi networking.

Wherein the wireless communication uses short-wavelength ultra high frequency (UHF) radio waves.

Wherein the wireless communication is with a cellular telephone that includes an exchange application that transmits information to the antenna with the information being the at least one image.

Wherein the antenna transmits information to an exchange application with an online marketplace, the information being transmitted is at least one of the following: a duration of the display of the at least one image, time of day the at least one image was displayed, a location of the windshield during the display of the at least one image, and confirmation that the at least one image was displayed by the electronic display.

Wherein the at least one image to be displayed on the electronic display is one of the following: an advertisement, a company logo, a personal message of an owner of a vehicle that includes the windshield, and a personal image of the owner of the vehicle.

Wherein the electronic display has an area that is more than fifty percent of an area of the first glass layer.

Wherein the first glass layer and the second glass layer are commercial grade hardened glass that meet automotive safety standards.

Wherein the electronic display is configured to display the at least one image towards an outer side of the windshield.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A transparent windshield for a vehicle, the transparent windshield comprising:
   a first glass layer;
   a second glass layer;
   a first plastic interlayer between the first glass layer and the second glass layer;
   an electronic display between the first glass layer and the plastic layer, the electronic display configured to display at least one image to a viewer outside of the vehicle and configured to be transparent to a viewer inside of the vehicle, wherein the at least one image is not visible to a viewer inside of the vehicle; and
   a controller in communication with the electronic display, the controller configured to receive the at least one image to be displayed on the electronic display and instruct the electronic display to display the at least one image.

2. The transparent windshield of claim 1, wherein the electronic display is a light-emitting diode (LED) screen.

3. The transparent windshield of claim 1, wherein the electronic display is a liquid crystal display (LCD) screen.

4. The transparent windshield of claim 1, further comprising:
   a second plastic interlayer between the electronic display and the second glass layer.

5. A vehicle that includes the transparent windshield of claim 1, further comprising:
   a battery to provide electrical power to the vehicle; and
   circuitry that electrically connects the electronic display to the battery.

6. The windshield of claim 1, further comprising:
   a memory module in communication with the controller, the memory module configured to store the at least one image to be displayed on the electronic display.

7. The transparent windshield of claim 1, further comprising:
   an antenna in communication with the controller, the antenna having wireless communication capabilities and configured to receive a wireless communication of the at least one image and transmit the at least one image to the controller.

8. The transparent windshield of claim 7, wherein the wireless communication is Wi-Fi networking.

9. The transparent windshield of claim 7, wherein the wireless communication uses short-wavelength ultra-high frequency (UHF) radio waves.

10. The transparent windshield of claim 7, wherein the wireless communication is with a cellular telephone that includes an exchange application that transmits information to the antenna with the information being the at least one image.

11. The transparent windshield of claim 7, wherein the antenna transmits information to an exchange application with an online marketplace, the information being transmitted is at least one of the following: a duration of the display of the at least one image, time of day the at least one image was displayed, a location of the windshield during the display of the at least one image, and confirmation that the at least one image was displayed by the electronic display.

12. The transparent windshield of claim 1, wherein the at least one image to be displayed on the electronic display is one of the following: an advertisement, a company logo, a personal message of an owner of a vehicle that includes the windshield, and a personal image of the owner of the vehicle.

13. The transparent windshield of claim 1, wherein the electronic display has an area that is more than fifty percent of an area of the first glass layer.

14. The transparent windshield of claim 1, wherein the first glass layer and the second glass layer are commercial grade hardened glass that meet automotive safety standards.

15. The vehicle of claim 5, further comprising:
   a motion sensor in communication with the controller, the motion sensor configured to detect human motion outside the vehicle indicating the presence of a person outside of the vehicle and transmit that information to the controller,
   wherein the controller instructs the electronic display to display the image when the controller receives information from the motion sensor that there is human motion outside of the vehicle.

16. The vehicle of claim 5, further comprising:
   a sound detection sensor in communication with the controller, the sound detection sensor configured to detect a sound of a human voice outside of the vehicle and transmit that information to the controller,
   wherein the controller instructs the electronic display to display the image when the controller receives information from the sound detection sensor that there is the sound of human voice outside of the vehicle.

* * * * *